(12) United States Patent
Cortese

(10) Patent No.: US 7,531,198 B2
(45) Date of Patent: May 12, 2009

(54) INFUSION METHOD AND DEVICE FOR MAKING A COFFEE BEVERAGE

(75) Inventor: Virginio Cortese, Turin (IT)

(73) Assignee: SGL Italia S.R.L., Turin (IT)

( * ) Notice: Subject to any disclaimer, the term of this patent is extended or adjusted under 35 U.S.C. 154(b) by 783 days.

(21) Appl. No.: 10/983,162

(22) Filed: Nov. 4, 2004

(65) Prior Publication Data
US 2005/0129809 A1  Jun. 16, 2005

(30) Foreign Application Priority Data
Nov. 7, 2003  (IT)  .......................... TO2003A0885

(51) Int. Cl.
*A23F 5/24*  (2006.01)
(52) U.S. Cl. .......................... 426/433; 426/77; 426/595; 99/295; 99/300
(58) Field of Classification Search .................. 426/77, 426/86, 425, 431–435, 594–596; 99/279, 99/295, 300, 323.3
See application file for complete search history.

(56) References Cited

U.S. PATENT DOCUMENTS

| | | | | |
|---|---|---|---|---|
| 2,939,381 A | * | 6/1960 | McBride | ....................... 99/295 |
| 2,968,560 A | * | 1/1961 | Goros | ......................... 99/295 |
| 3,088,826 A | * | 5/1963 | Renner et al. | ................ 426/394 |
| 3,139,343 A | * | 6/1964 | Baselt | .......................... 426/394 |
| 3,403,617 A | * | 10/1968 | Lampe | .......................... 99/295 |
| 3,408,921 A | * | 11/1968 | Freese | .......................... 99/295 |
| 3,470,812 A | * | 10/1969 | Levinson | ...................... 99/295 |
| 5,899,137 A | * | 5/1999 | Miller et al. | ................... 99/295 |
| 6,607,762 B2 | * | 8/2003 | Lazaris et al. | ................. 426/79 |
| 2001/0048957 A1 | | 12/2001 | Lazaris et al. | |
| 2005/0166766 A1 | * | 8/2005 | Jones et al. | .................... 99/330 |
| 2007/0141215 A1 | * | 6/2007 | Bunke et al. | ................. 426/433 |

FOREIGN PATENT DOCUMENTS

EP         1 295 554        3/2003

* cited by examiner

*Primary Examiner*—Drew E Becker
(74) *Attorney, Agent, or Firm*—Ladas and Parry LLP

(57) ABSTRACT

To make a coffee beverage in a coffee percolator, hot water is fed, at relatively low pressure of about two atmospheres, into a sealed capsule defined by a cup-shaped body housing a measure of ground coffee and closed in fluidtight manner at an open end by a sealing wall connected integrally to the cup-shaped body; the beverage being extracted from the sealed capsule through hollow extraction needles, which have longitudinal inlet slits of substantially 0.3 mm in width, and are inserted into the sealed capsule through the sealing wall before the hot water is fed into the sealed capsule, and so that the relative longitudinal slits extend inside the sealed capsule by respective lengths at least equal to a third of the depth of the relative cup-shaped body.

7 Claims, 3 Drawing Sheets

INFUSION METHOD AND DEVICE FOR MAKING A COFFEE BEVERAGE

The present invention relates to an infusion method and device for making a coffee beverage.

BACKGROUND OF THE INVENTION

More specifically, the present invention relates to an infusion method and device for making a "weak" coffee beverage or so-called "American coffee" using a sealed capsule containing a measure of ground coffee.

For percolating coffee, a coffee percolator is used comprising a pressurized-hot-water dispenser, and a cup facing the dispenser and housing a rigid sealed capsule containing a measure of ground coffee. The sealed capsule is normally defined by a cup-shaped body of thermoplastic material closed at one end by an end wall, and at the other end by a sealing wall normally made of metal sealing foil; and the cup is movable, with respect to the dispenser, to and from an infusion position connected to the dispenser, and houses the sealed capsule with the sealing wall facing the dispenser.

In known coffee percolators employing a sealed capsule, the hot water, emitted by the dispenser at a pressure of normally around 8-10 atmospheres, normally flows into the sealed capsule by at least one feed needle piercing the sealing wall when the cup is moved into said infusion position. Once inside the sealed capsule, the hot water mixes with and compresses the ground coffee towards the end wall, which, by virtue of the internal pressure and temperature, deforms outwards into contact with a number of hollow extraction needles carried by the cup and each having a number of longitudinal lateral slits of about 0.2 mm in width. The hollow extraction needles gradually penetrate the sealed capsule to a length normally equal at most to a fifth of the depth of the sealed capsule, and allow the coffee beverage to flow out through a percolator spout communicating with the inside of the cup.

Known percolators of the type described above are normally so-called "espresso" percolators, in which the content of a sealed capsule is used to produce an "espresso coffee", i.e. a coffee beverage of about 20 $cm^3$ in volume and topped with an air-emulsified layer. Such a layer, which is extremely popular with consumers and invariably sought after by manufacturers, is formed by the small flow section and the length of the extraction needle slits, which, being much narrower than the coffee grains, induce steady vortices of emulsion at the outlet, which are further created by the high hot-water feed pressure, by compression of the ground coffee against the end wall of the sealed capsule (normally enhanced by a press effect produced by the sealed capsules normally being conical), and by the short length of the extraction needles, which intercept the beverage close to the end wall of the sealed capsule.

Known percolators of the above type, however, fail to provide, using the same sealed capsule, for producing a "weak" beverage, i.e. "American coffee", of about 200 $cm^3$ in volume. This is because, after a relatively short time, gradual compaction of the ground coffee against the end wall of the sealed capsule reduces hot-water flow through the sealed capsule to such an extent as to make the time taken to produce such a "weak" beverage unacceptable. Moreover, preferential passages are soon formed in the ground coffee inside the sealed capsule, so that, within a relatively short initial period, a beverage closely resembling espresso coffee, with, in this case, an undesired emulsified surface layer, is produced, followed by production of no more than barely coloured hot water, the resulting mixture of which is normally considered undrinkable.

SUMMARY OF THE INVENTION

It is an object of the present invention to provide an infusion method for making a "weak" coffee beverage quickly and easily from a standard sealed capsule, i.e. a sealed capsule normally used for making a "strong" beverage such as espresso coffee.

According to the present invention, there is provided an infusion method for making a coffee beverage, the method comprising the steps of feeding hot water, at relatively low pressure of about two atmospheres, into a sealed capsule defined by a cup-shaped body of given depth, the cup-shaped body housing a measure of ground coffee, being closed at one end by an end wall, and being closed in fluidtight manner, at an open end opposite said end wall, by a sealing wall connected integrally to the cup-shaped body; and extracting said beverage from the sealed capsule through hollow extraction needles having longitudinal inlet slits, said extraction needles being inserted into the sealed capsule through said sealing wall and prior to feeding hot water into the sealed capsule; and each said longitudinal slit, when extracting said beverage, extending inside the sealed capsule by a length at least equal to a third of said depth.

According to the present invention, there is also provided an infusion device for making a coffee beverage, the infusion device comprising a cup of a given depth and for housing a sealed capsule defined by a cup-shaped body housing a measure of ground coffee and closed at one end by an end wall and at another end by a sealing wall connected integrally to the cup-shaped body, said sealed capsule being positioned inside said cup with the sealing wall facing outwards; feed means for feeding hot water, at relatively low pressure of about two atmospheres, into a said sealed capsule carried by said cup; and piercing means facing said cup to pierce the sealing wall of a said sealed capsule carried by said cup, and to extract said beverage from the sealed capsule; said piercing means comprising a number of hollow extraction needles having longitudinal inlet slits; and each said longitudinal slit being of a length at least equal to a third of said depth.

BRIEF DESCRIPTION OF THE DRAWINGS

A number of non-limiting embodiments of the invention will be described by way of example with reference to the accompanying drawings, in which.

DETAILED DESCRIPTION OF THE INVENTION

Figure 1:
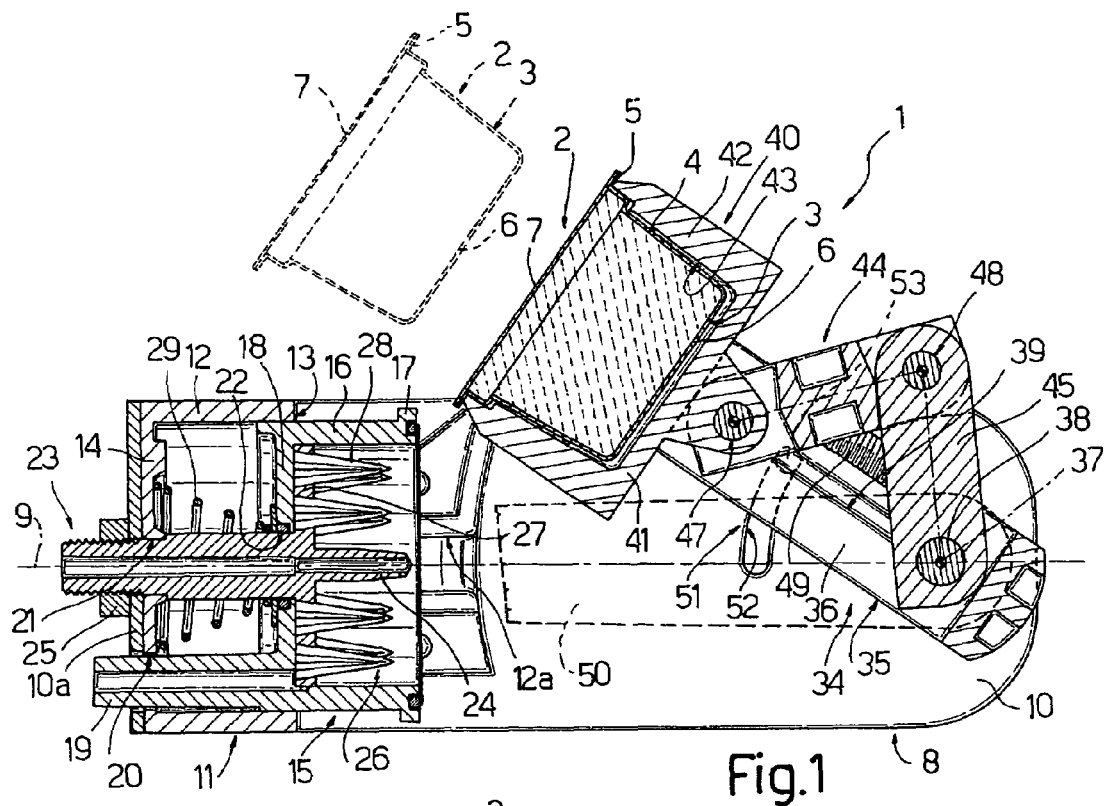
FIG. 1 shows an axial section of a preferred embodiment of the infusion device according to the present invention in a first operating position.

Number 1 in FIGS. 1 to 4 indicates as a whole an infusion device for making a "weak" coffee beverage, in particular a so-called "American coffee", from a standard sealed capsule 2, i.e. a sealed capsule normally used in percolators for making espresso coffee. Sealed capsule 2 comprises a cup-shaped body 3 made of thermoplastic material and having a generally truncated-cone-shaped lateral wall 4, which has an outer annular flange 5 at its major base, and is closed at its minor base by an end wall 6. At the major base of lateral wall 4, cup-shaped body 3 is closed in fluidtight manner by a sealing wall 7, normally made of metal or metalized sealing foil, the periphery of which is connected integrally to the outer surface of annular flange 5.

Infusion device 1 comprises a fixed frame 8 having a longitudinal axis 9, which, in the accompanying drawings, is positioned horizontally, but which may extend in any direction. Frame 8 is defined by two substantially rectangular plates 10 positioned symmetrically on opposite sides of and parallel to longitudinal axis 9. At one longitudinal end, plates 10 are connected integrally to each other by a transverse wall 10a supporting a cup-shaped body 11, which is located between plates 10, is internally cylindrical, and comprises a tubular lateral wall 12, which is coaxial with longitudinal axis 9, defines an annular shoulder 13 at its inner end, and is closed at its outer end by an end wall 14 perpendicular to longitudinal axis 9 and contacting the inner surface of transverse wall 10a.

A percolator cup 15 is fitted in sliding manner inside cup-shaped body 11, and has a lateral wall 16 coaxial with longitudinal axis 9 and fitted in sliding manner to the inner surface of lateral wall 12 of cup-shaped body 11, and to two axial guides 12a carried by plates 10. At one end, lateral wall 16 has an outer flange 17 facing shoulder 13, and is closed at the other end by an end wall 18 facing end wall 14 and fitted with a longitudinal percolator spout 19 extending in sliding manner through a hole 20 formed through end wall 14 and transverse wall 10a.

Walls 10a and 14 and end wall 18 have respective through holes 21 and 22 coaxial with longitudinal axis 9 and engaged by a tubular member 23, which is fitted on its inner end with a feed needle 24 coaxial with longitudinal axis 9, and is connected at the opposite end, outside end wall 14, to an outlet of a known boiler (not shown) supplied in known manner by a known pump (not shown) to feed hot water to feed needle 24 at a pressure of about two atmospheres.

In a variation not shown, a number of feed needles 24 are connected to tubular member 23.

The outer end, extending through hole 21, of tubular member 23 is threaded and locked to end wall 14 by an external nut 25, while the inner end of tubular member 23 is fitted integrally with a piercing device 26 comprising a plate 27 perpendicular to longitudinal axis 9, housed in sliding manner inside percolator cup 15, and fitted through centrally with feed needle 24; and a number of tubular extraction needles 28 fitted through plate 27, parallel to longitudinal axis 9, and spaced about feed needle 24. A helical spring 29, coaxial with longitudinal axis 9, is compressed between end walls 14 and 18, and plate 27 defines a stop for arresting percolator cup 15 in an extracted rest position, shown in FIG. 1, in which feed needle 24 and extraction needles 28 are housed entirely inside percolator cup 15.

As shown more clearly in FIGS. 5 to 8, extraction needles 28 are slightly shorter than feed needle 24, and have a conical outer surface 30; and each extraction needle 28 has four lateral through slits 31, each of over 0.2 mm, and preferably of about 0.3 mm, in width, but at any rate of such a width as not to let through the smallest-diameter grains of the ground coffee used. Each lateral slit 31 extends along a respective generating line of relative conical outer surface 30, from plate 27 to just short of the free end of relative extraction needle 28, and by a length at least equal to a third, and preferably ranging between half and two thirds, of the depth of cup-shaped body 3. Slits 31 of extraction needles 28 connect the inside of percolator cup 15 to an outlet chamber 32 (FIG. 3), which communicates with percolator spout 19 and is formed between plate 27 and end wall 18 when percolator cup 15 is moved axially towards end wall 14 in opposition to spring 29.

In the variation shown in FIGS. 9 to 12, extraction needles 28 have a pyramid-shaped outer surface 33 with four equal faces, each having a slit 31 extending along a bisector of the face.

Figure 3:
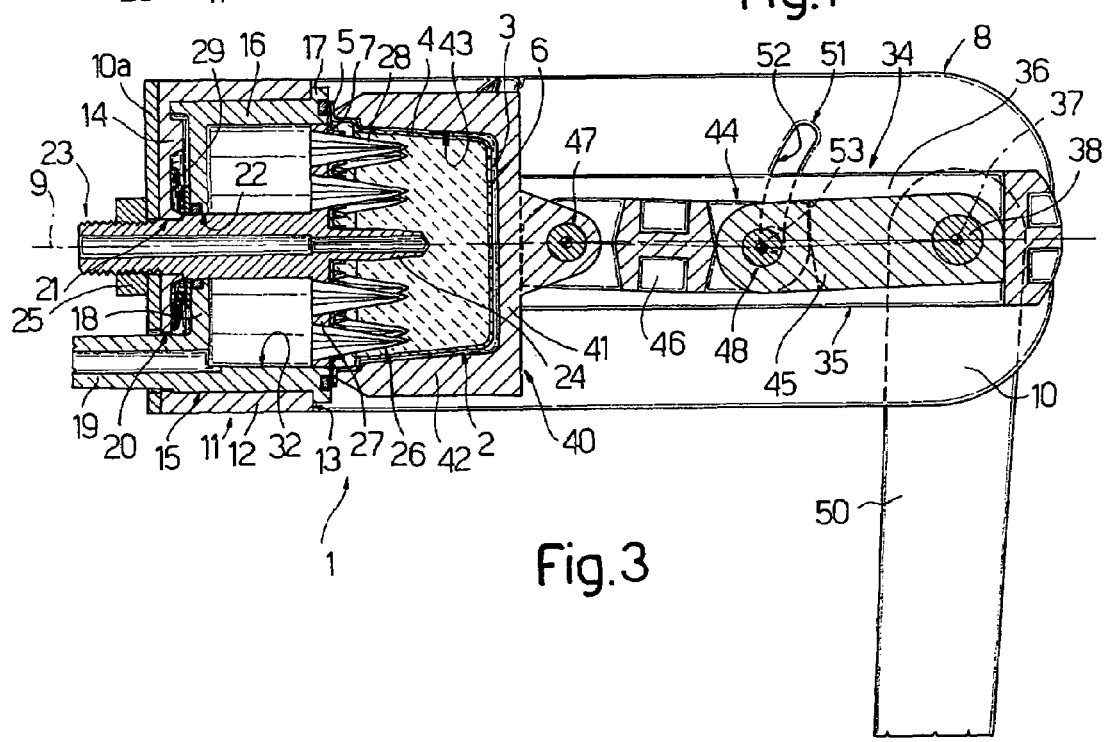
FIGS. 2 and 3 are similar to FIG. 1, and show the FIG. 1 infusion device in a further two operating positions.
Figure 2:
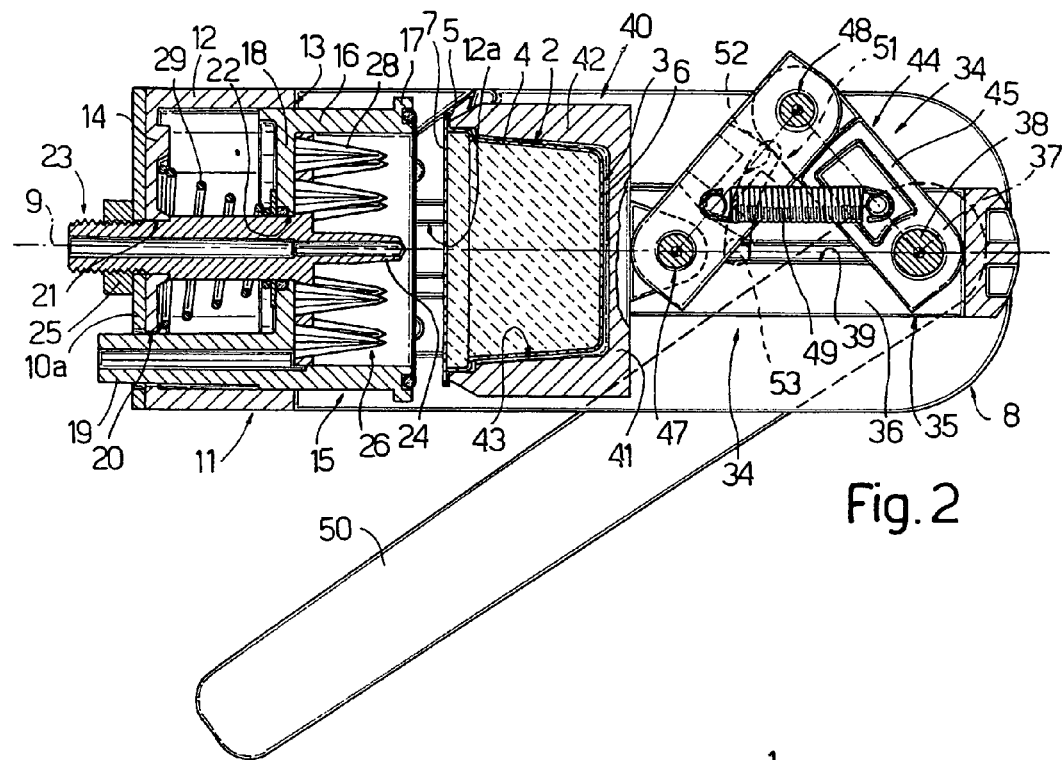
Figure 4:
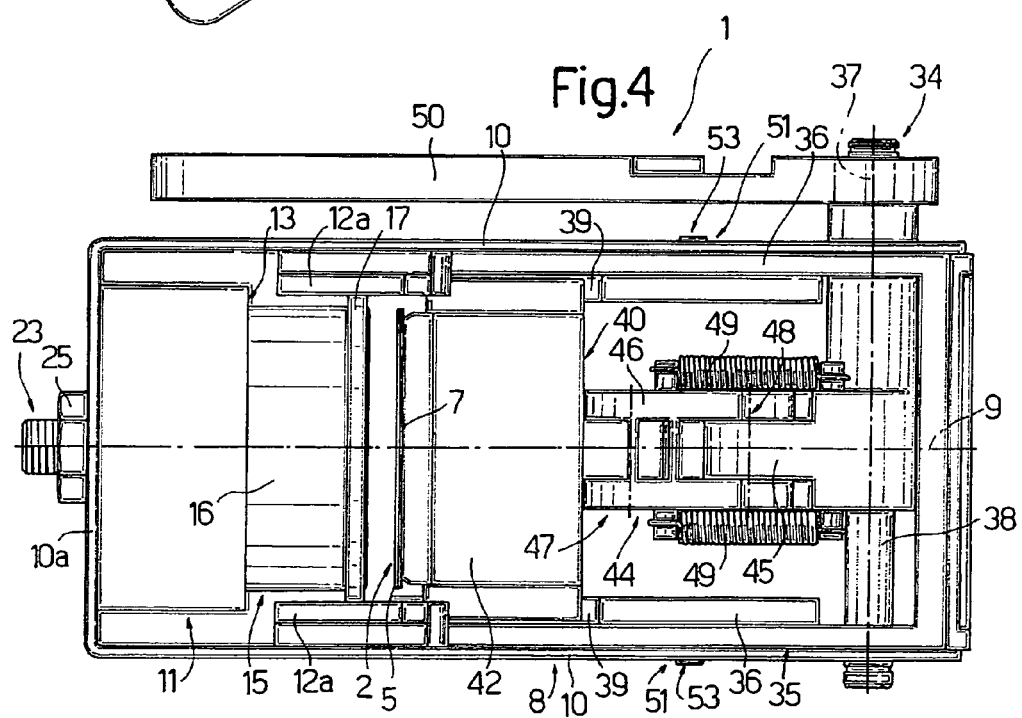
FIG. 4 shows a plan view of the FIG. 1-3 infusion device in the FIG. 2 operating position.
Figure 5:
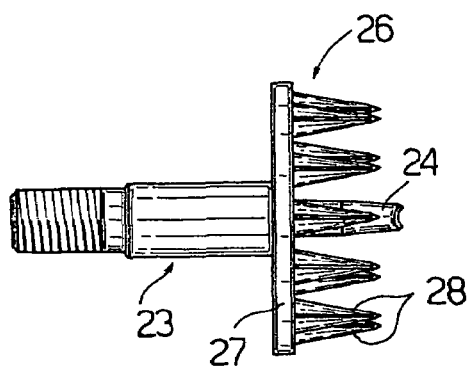
FIG. 5 shows a side view of a detail in FIGS. 1-4.
Figure 6:
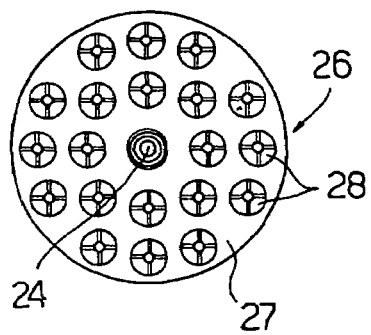
FIG. 6 shows a front view of the FIG. 5 detail.
Figure 7:
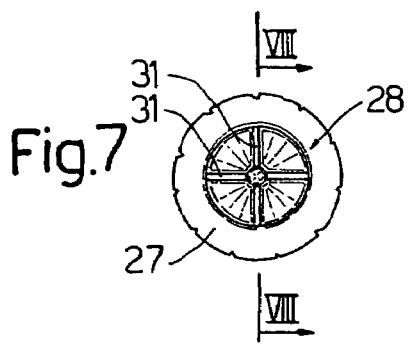
FIG. 7 shows a larger-scale view of a detail in FIG. 6.
Figure 8:
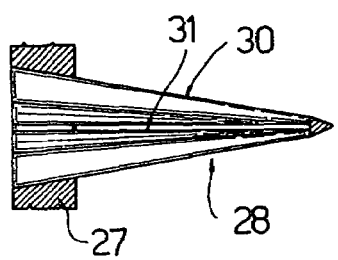
FIG. 8 shows a section along line VIII-VIII in FIG. 7.
Figure 9:
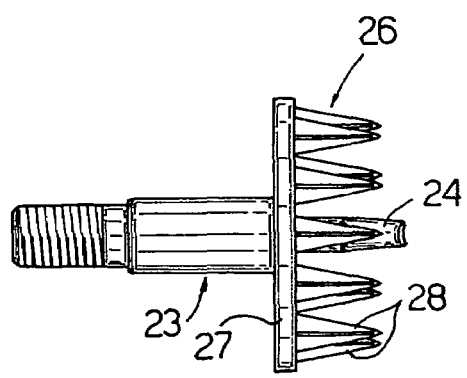
FIGS. 9 to 12 are similar to FIGS. 5 to 8 respectively, and show a variation of the FIG. 5 detail.
Figure 10:
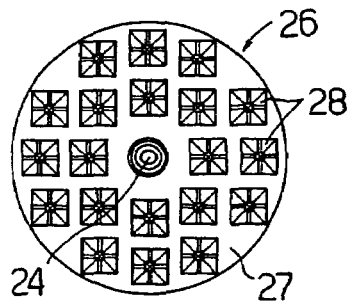
Figure 11:
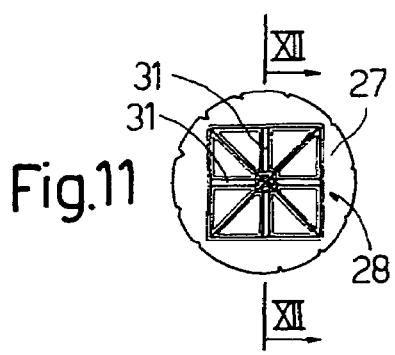
Figure 12:
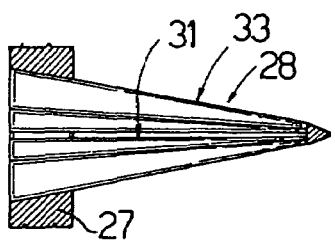

With reference to FIGS. 1 to 3, in the space between plates 10 not occupied by cup-shaped body 11 and percolator cup 15, an actuating device 34 is mounted to move a sealed capsule 2 to and from a percolating position (FIG. 3), and comprises a fork 35 positioned with its concavity facing percolating cup 15, and in turn comprising two arms 36 parallel to plates 10 and which oscillate about an axis 37, perpendicular to longitudinal axis 9, of a pin 38 fitted in rotary manner through plates 10 and arms 36. Arms 36 define respective lateral antirotation, axial-slide guides 39 for a cup 40 positioned with its concavity facing percolator cup 15, and comprising an end wall 41 kept perpendicular to lateral guides 39 at all times by lateral guides 39 themselves; and a lateral wall 42, which, together with end wall 41, defines a cavity 43 for housing, relatively accurately, a sealed capsule 2 positioned with its annular flange 5 resting on the free end of lateral wall 42.

Actuating device 34 also comprises a crank mechanism 44 located between pin 38 and end wall 41 of cup 40, and in turn comprising a crank 45 fitted to a portion of pin 38 extending between arms 36; a connecting rod 46 connected at one end to end wall 41 by a hinge 47, and at the other end to a free end of crank 45 by a hinge 48; and two springs 49 stretched between respective intermediate points of crank 45 and respective intermediate points of connecting rod 46 to normally keep crank mechanism 44 in a contracted position (FIG. 2) in which connecting rod 46 and crank 45 are substantially perpendicular to each other.

Actuating device 34 also comprises an actuating lever 50 located outside plates 10 and fitted to pin 38 to swing fork 35 along an arc bounded by a guide and angular stop device 51, which, for each plate 10, comprises a curved slot 52 formed in relative plate 10 about axis 37; and a pin 53 extending outwards from relative arm 36 and engaging and sliding transversely inside relative slot 52. The sliding movement of pins 53 along relative slots 52 allows fork 35 to swing about axis 37 between a work position (FIG. 3) aligned with longitudinal axis 9, and a loading position (FIG. 1), in which fork 35 forms, with longitudinal axis 9, a large enough angle to set cup 40 to a position shifted laterally with respect to percolating cup 15.

In actual use, as shown in FIG. 1, fork 35 is first set to the loading position, and, after receiving sealed capsule 2, which is positioned inside cavity 43 with annular flange 5 contacting the free annular edge of lateral wall 42, is moved into the work position (FIG. 2) by operating lever 50. In this connection, it should be pointed out that, since fork 35 is fitted in rotary manner to pin 38, rotation of lever 50 is transmitted to fork 35 by crank mechanism 44, which is maintained in the contracted position by springs 49 and, in the absence of a resisting torque on fork 35, acts as a key interposed between pin 38 and fork 35.

When fork 35 is arrested in the work position by guide and angular stop device 51, further rotation of lever 50 rotates crank 45 (anticlockwise in the drawings) about axis 37, and moves cup 40 along guides 39 towards percolator cup 15. As it moves along, cup 40 first connects annular flange 5 in fluidtight manner to flange 17 of percolator cup 15, and then moves percolator cup 15 axially towards end wall 14 of cup-shaped body 11 in opposition to spring 29. During this movement, piercing device 26 is gradually extracted from percolator cup 15 to form outlet chamber 32, and is moved towards sealing wall 7, which is first pierced by feed needle 24, and then by all of extraction needles 28.

When crank mechanism 44 is eventually set to a distended position, in which crank 45 and connecting rod 46 are aligned with each other and with longitudinal axis 9, sealing wall 7 is positioned substantially contacting plate 27, and extraction needles 28 extend inside sealed capsule 2, and hence cavity 43, so that relative slits 31 extend inside sealed capsule 2, and hence cavity 43, by a length at least equal to a third of the depth of cup 40 and preferably, in the example shown, by a length ranging between half and two thirds of the depth of cup 40.

Only then is hot water pumped, at relatively low pressure of about two atmospheres, into sealed capsule 2 along tubular member 23 and feed needle 24, and, after impregnating the ground coffee inside sealed capsule 2, the hot water flows out through slits 31 in extraction needles 28 into outlet chamber 32 and out through percolator spout 19.

In connection with the above, it should be pointed out that:
pressurized hot water is fed into the centre of the mass of ground coffee inside sealed capsule 2, thus impregnating the mass of ground coffee as a whole and preventing the formation of preferential passages;
outflow is directed towards sealing wall 7, thus preventing, in the event sealed capsule 2 has a truncated-cone-shaped lateral wall 4, the press effect referred to previously, and compaction of the ground coffee on extraction needles 28;
in the event sealed capsule 2 has a truncated-cone-shaped lateral wall 4, the hot water fed into sealed capsule 2 expands towards sealing wall 7 to distribute the water evenly through the ground coffee;
slits 31 are longer and preferably wider than those of extraction needles of espresso coffee percolators, and are not subject to clogging, by being long enough at any rate to prevent complete clogging, even in the event the ground coffee is partly compacted.

In short, increasing the width and length of slits 31, the relatively low pressure at which hot water is fed into sealed capsule 2, feeding hot water substantially into the centre of the measure of ground coffee, and directing outflow towards sealing wall 7, provide for involving the whole measure of ground coffee, and for maintaining relatively low hydraulic resistance of sealed capsule 2, thus obtaining a satisfactory outflow with no emulsifying effect, and the reasonably fast production of a "weak" coffee beverage using sealed capsules 2 normally used on "espresso" coffee percolators.

In a variation not shown, feed needle 24 projects inside cavity 43 from end wall 41 of cup 40, and pierces end wall 6 of sealed capsule 2 when cup 40 is moved by actuating device 34 towards and into contact with flange 17 of percolator cup 15.

In this case too, pressurized hot water flow, inside sealed capsule 2, is directed towards sealing wall 7.

The invention claimed is:

1. An infusion method for making a coffee beverage, the method comprising the steps of feeding hot water, at relatively low pressure of about two atmospheres, into a sealed capsule (2) defined by a cup-shaped body (3) of given longitudinal depth, the cup-shaped body (3) housing a measure of ground coffee, being closed at one end by an end wall (6), and being closed in fluidtight manner, at an open end opposite said end wall (6), by a sealing wall (7) connected integrally to the cup-shaped body (3); hot water being fed into the sealed capsule (2) by inserting at least one hollow feed needle (24) into the sealed capsule (2); and extracting said beverage from the sealed capsule (2) through hollow extraction needles (28) having longitudinal inlet slits (31), said feed needle (24) being inserted into the sealed capsule (2) through said sealing wall (7); said extraction needles (28) being inserted into the sealed capsule (2) and into the ground coffee through said sealing wall (7) and prior to feeding hot water into the sealed capsule (2); and each said longitudinal slit (31), when extracting said beverage, extending inside the sealed capsule (2) by a length at least equal to a third of said longitudinal depth.

2. A method as claimed in claim 1, wherein, when extracting said beverage, each said longitudinal slit (31) extends inside the sealed capsule (2) by a length at least equal to half said longitudinal depth.

3. A method as claimed in claim 1, wherein said longitudinal slits (31) are over 0.2 mm in width.

4. A method as claimed in claim 1, wherein said longitudinal slits (31) are about 0.3 mm in width.

5. A method as claimed in claim 1, wherein said cup shaped body (3) flares towards said sealing wall (7); the hot water expanding as it flows towards said extraction needles (28).

6. A method as claimed in claim 1, wherein said extraction needles (28) and said feed needle (24) are inserted together inside the sealed capsule (2) through said sealing wall (7).

7. A method as claimed in claim 1, wherein said feed needle (24) is longer than said extraction needles (28).

* * * * *